United States Patent
Roβkamp et al.

(10) Patent No.: US 8,389,143 B2
(45) Date of Patent: Mar. 5, 2013

(54) PORTABLE HAND-GUIDED ELECTRIC DEVICE WITH BATTERY PACK

(75) Inventors: Heiko Roβkamp, Adelberg (DE);
Harald Mang, Winnenden (DE);
Matthias Müller, Remshalden (DE);
Volker Reber, Michelbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 278 days.

(21) Appl. No.: 12/709,609

(22) Filed: Feb. 22, 2010

(65) Prior Publication Data

US 2010/0221594 A1 Sep. 2, 2010

(30) Foreign Application Priority Data

Feb. 27, 2009 (DE) .......................... 10 2009 012 184

(51) Int. Cl.
*H01M 2/10* (2006.01)
*H01R 13/64* (2006.01)

(52) U.S. Cl. ....................................... 429/100; 439/248

(58) Field of Classification Search .................. 227/131, 227/217, 8, 130, 156; 429/96, 99, 100; 439/500, 439/247, 248; 173/131, 217
See application file for complete search history.

(56) References Cited

U.S. PATENT DOCUMENTS

| 4,871,629 | A | 10/1989 | Bunyea |
| 4,930,583 | A | 6/1990 | Fushiya |
| 5,054,563 | A * | 10/1991 | Zapf .............................. 173/217 |
| 5,216,371 | A * | 6/1993 | Nagai ............................ 324/428 |
| 5,671,815 | A | 9/1997 | Kabatnik et al. |
| 6,319,053 | B1 | 11/2001 | Andrews |
| 6,376,942 | B1 | 4/2002 | Burger et al. |
| 6,536,536 | B1 * | 3/2003 | Gass et al. ......................... 173/2 |
| 2008/0084181 | A1 * | 4/2008 | Griffin ........................ 320/114 |
| 2008/0187822 | A1 | 8/2008 | Breitenbach |

FOREIGN PATENT DOCUMENTS

| DE | 19521426 A1 | 12/1996 |
| EP | 1 036 637 A1 | 9/2000 |
| EP | 1419723 A2 | 5/2004 |

* cited by examiner

*Primary Examiner* — Carlos Barcena
(74) *Attorney, Agent, or Firm* — Gudrun E. Huckett (57) ABSTRACT

A hand-held electric device has a device housing with a battery pack compartment. A battery pack is disposed in the battery pack compartment. The battery pack compartment has guide elements extending in the insertion direction of the battery pack. The battery pack has a battery pack housing and guide sections provided on the battery pack housing that interact with the guide elements. The battery pack has an electric connector head disposed on the battery pack housing. The battery pack compartment has contact elements. In a predetermined insertion position of the battery pack in the battery pack compartment the contact elements electrically contact the connector head. A contact plate is floatingly supported in the battery pack compartment and the contact elements are disposed on the contact plate.

23 Claims, 6 Drawing Sheets

PORTABLE HAND-GUIDED ELECTRIC DEVICE WITH BATTERY PACK

BACKGROUND OF THE INVENTION

The invention relates to a hand-held electric device, in particular a portable hand-guided power tool such as a hedge trimmer, a motor chain saw, a grass or brush trimmer or the like, comprising a housing in which a battery pack compartment is provided as a receptacle for a battery pack. The battery pack compartment comprises guide elements extending in the insertion direction of the battery pack and interacting with guide sections of the battery pack. An electric connector head is formed on the housing of the battery pack wherein the connector head has correlated therewith contact elements positioned within the battery pack compartment in such a way that in a predetermined insertion position of the battery pack in the battery pack compartment the contact elements electrically contact the connector head.

U.S. 2008/0187822 A1 discloses an electric hand-held power tool, i.e., a cordless electric screwdriver, that has a battery pack installed in the grip of the power tool. The battery pack is comprised of three battery cells and is inserted by means of guide rails into a battery pack compartment provided within the grip. Electric contacting is realized in the insertion direction.

When it is necessary to provide greater voltage and greater power, the battery packs must have more battery cells, for example, 15, 30 and even more battery cells. With increasing number of battery cells, the weight of a battery pack also increases so that its insertion into the battery pack compartment and its contacting with the electric contacts provided within the electric device become difficult.

SUMMARY OF THE INVENTION

It is an object of the present invention to configure an electric power tool with a battery pack compartment for receiving a battery pack with a plurality of battery cells in such a way that even battery packs with a large volume or size can be safely and reliably inserted and electrically contacted.

In accordance with the present invention, this is achieved in that the contact elements in the battery pack compartment are disposed on a contact plate and in that the contact plate is floatingly supported in the battery pack compartment.

Since the contact elements are secured in the battery pack compartment on a floatingly supported contact plate, positioning imprecisions between a connector head of the battery pack and the contact elements can be automatically compensated without mechanically damaging the contacts or incomplete electrical contacting between contact head and contact elements.

Preferably, the contact plate is secured so as to be moveable within the plane of extension of the plate such that it can align itself relative to the battery pack positioned in the battery pack compartment. Expediently, for this purpose the contact plate is secured with play on the guide elements of the battery pack compartment that extend in the insertion direction.

In order to reliably prevent that the contact plate is lifted out of the battery pack compartment when exchanging the battery pack, it is provided that the contact plate is connected to the bottom of the battery pack compartment; preferably, it is locked on the bottom of the battery pack compartment. In this way, removal forces acting in the removal direction on the contact plate when removing the battery pack in a direction opposite to the insertion direction can be absorbed without the floating support of the contact plate itself being impaired.

Expediently, the contact plate is arranged in a contact plate holder that is guided and secured on the guide elements of the battery pack compartment and preferably serves as a support for additional electric components of the electric device. Such a contact plate holder can be embodied as a modular assembly that, before being inserted into the device housing of an electric device, is fitted with components.

When the guide elements of the battery pack compartment engage with play the guide sections of the battery pack, the battery pack in the battery pack compartment is movable as is the contact plate within the battery pack compartment so that the battery pack is also moveable relative to the contact plate.

For contacting, the connector head of the battery pack has contact slots for engagement of contact elements of the contact plate wherein the contact slots extend from the bottom of the connector head to its end face. Expediently, for a prepositioning action, a centering element is arranged on the contact plate and projects upwardly past the contact elements and engages in an initial insertion position a centering receptacle provided in the connector head.

Expediently, the battery pack is locked in the battery pack compartment when in its final insertion position wherein the battery pack preferably is secured against the force of a lifting spring. This can be realized in a simple way by two locking members that are arranged on opposed longitudinal sides of the battery pack compartment and interact with locking stops provided on the housing of the battery pack. In this connection, the locking member is preferably embodied as a pivot lever whose bearing bolt is captively secured between a top housing part and a bottom housing part. The kinematics of the locking member are such that the locking action is self-locking.

DESCRIPTION OF THE PREFERRED EMBODIMENTS

Figure 1:
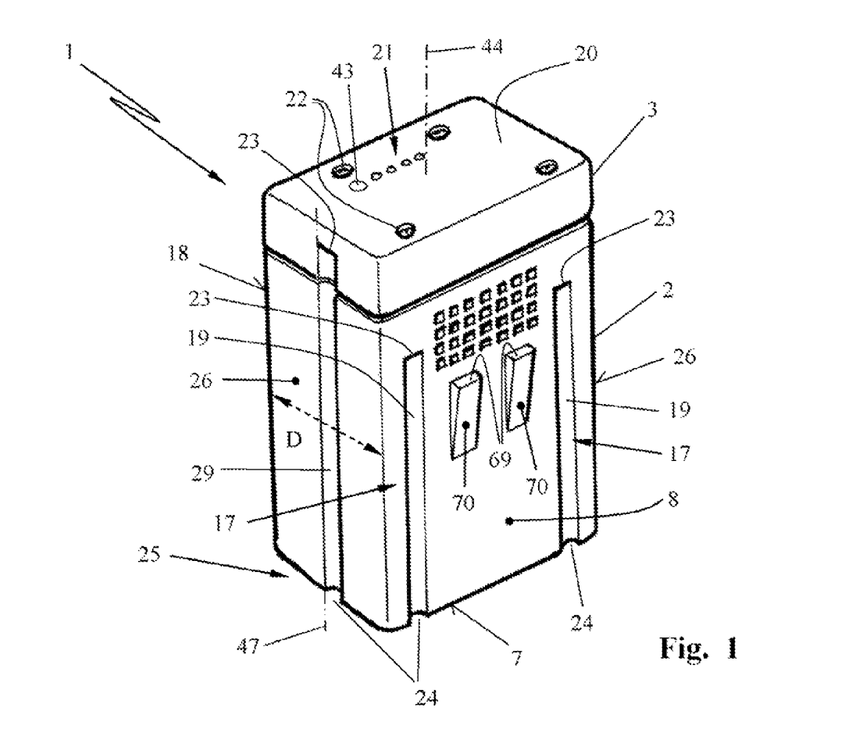
FIG. 1 is a perspective illustration of a battery pack for a hand-held electric device.

The battery pack 1 illustrated in FIG. 1 is comprised of a cup-shaped housing 2 that is closed off by a cover 3. The battery pack 1 serves as an energy supply for an electric power tool, in particular for a hand-held power tool such as a motor chain saw, a hedge trimmer, a cut-off machine, a grass or brush trimmer, an edger, a pole to pruner, a blower, a sprayer, a vacuuming device, an earth auger, a multi-task motor device with multi-functional attachments, a sweeper, a rotary hoe, a rototiller (cultivator), a high-pressure cleaning device, a lawnmower, a dethatcher, a shredder or chopper, a wet/dry vacuuming device, or a similar power tool that is preferably portable. In the housing 2 of the battery pack 1 battery cells are secured in a mechanically fixed way in a suitable battery cell arrangement wherein the electrically connected battery cells 9 are to be connected by a connector head 4 with external contacts 51. The connector head 4 projects away from the plane 5 of the housing bottom 6 that forms a lower end face 7 of the battery pack. As shown especially in FIG. 6, the connector head 4 is positioned adjacent to a wide longitudinal side 8 near an edge of the lower end face 7 wherein the height h of the connector head 4 can also determine the tilting position of the battery pack 1.

Figure 8:
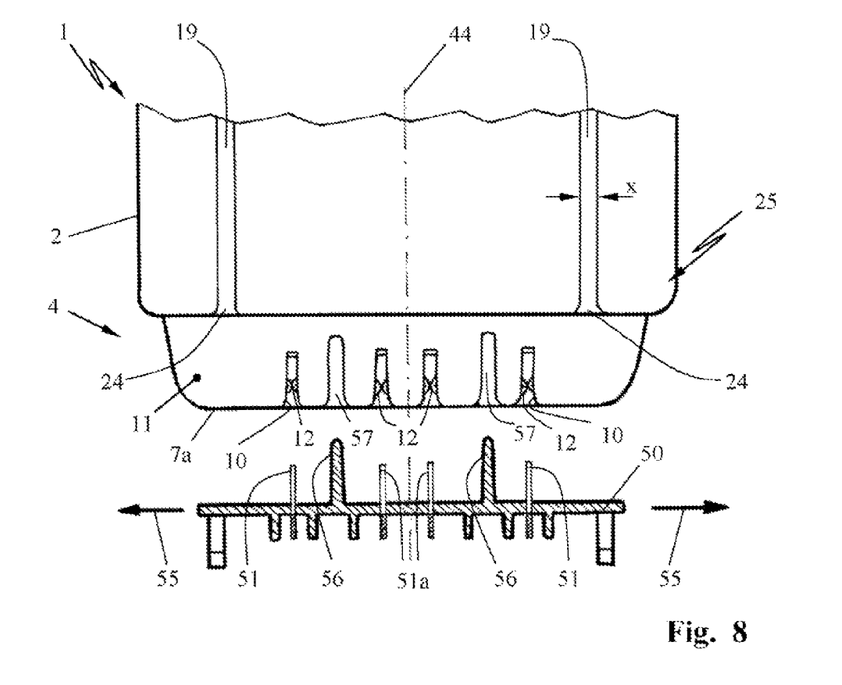
FIG. 8 is a schematic illustration showing the correlation of a contact plate with a connector head of the battery pack.
Figure 9:
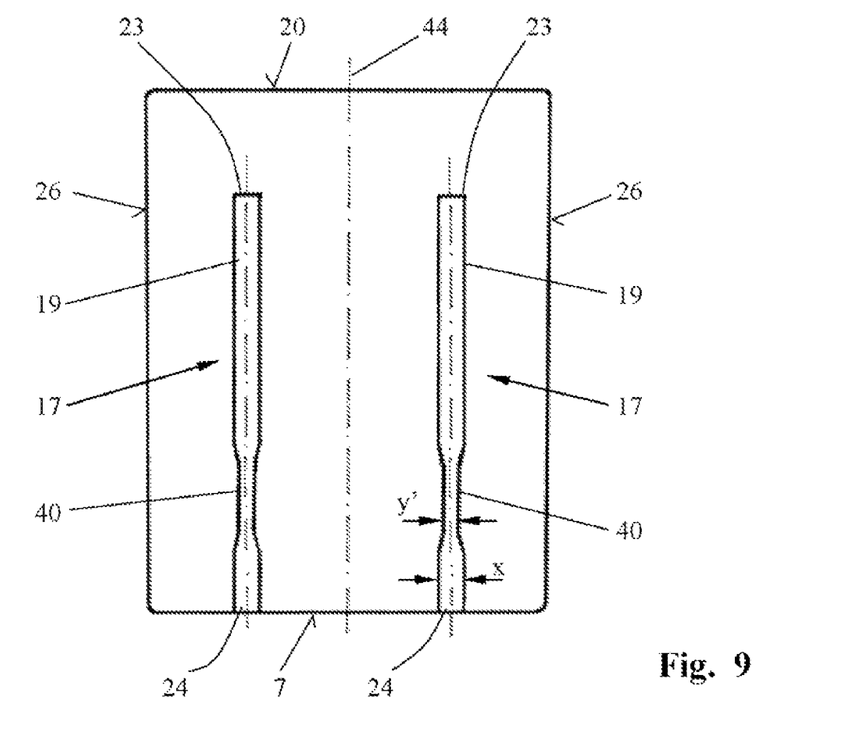
FIG. 9 shows in schematic illustration a side view onto a further battery pack with modified guide sections.
Figure 10:
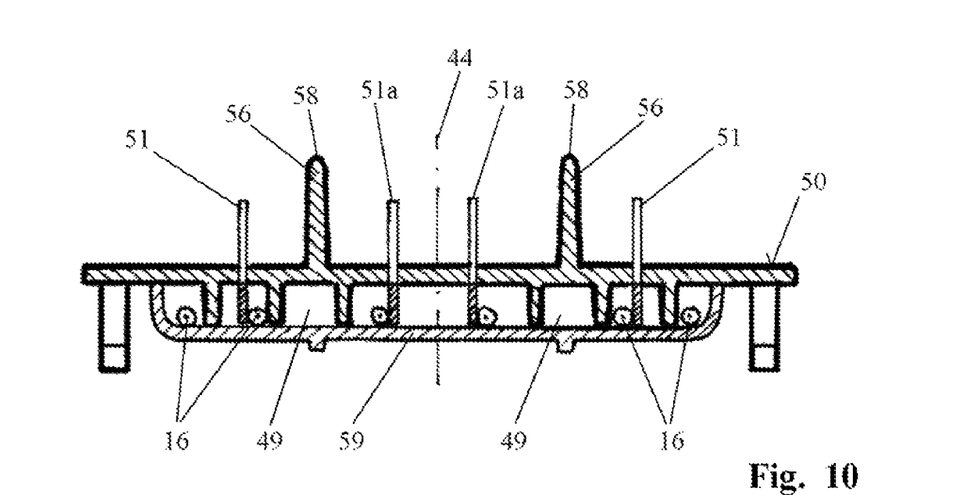
FIG. 10 shows in section a contact plate according to FIG. 8.

In the connector head 4 there are contact slots 10 that, as shown in FIG. 8, extend to the longitudinal front side 11 that is adjacent to the wide longitudinal side 8 of the battery pack housing 2. The contact slots 10 thus have an approximately L-shaped configuration.

Through the contact slots 10 the contact clips 12 can be contacted. Each one of the contact clips 12 is secured in a receptacle 13 in such a way that the contact clips 12 are contactable through the L-shaped contact slots 10.

As a result of the L-shaped contact slots 10, contact elements 51 can be inserted into the contact clip 12 from the longitudinal side 11 in the direction of arrow 14 as well as perpendicularly thereto in an insertion direction in the direction of arrow 15. A combined movement with movement components in the directions of arrows 14, 15 is also possible.

The contact clips 12 are positioned at the end of connecting leads 16 that are electrically connected to the battery cells 9 arranged in the housing 2 of the battery pack 1. Moreover, contact clips 12a are provided that are connected to signal lines 16a that are connected, for example, to an electronic unit arranged in the battery pack 1.

The battery cells 9 can be embodied as an NiCd cell (nickel cadmium cell), an NiMH cells (nickel metal hydride cell), a LiIo cell (lithium ion cell), a LiPo cell (lithium polymer cell), a LiFePO4 cell (lithium iron phosphate cell), a lithium titanate cell or a similar cell. In particular, battery cells on the basis of lithium are provided having cell voltages of 2 to 5 volts, preferably 3.6 to 3.7 volts, wherein the output signals of protective circuits arranged in the battery pack 1 can be output through the signal lines 16a. The number of battery cells depends on the desired voltage of, for example, 12 volts up to 120 volts and more, preferably, a battery pack voltage of 36 or 42 volts is provided. The capacity of battery packs is in the range of 2 Ah to 10 Ah.

The battery pack illustrated in FIG. 1 has on its wide longitudinal sides 8, 18 two guide sections 17 each that in the illustrated embodiments are embodied as guide grooves 19. The guide grooves 19 extend between the lower end face 7 provided with the connector head 4 and an upper end face 20 formed on the cover 3. The cover 3 is secured on the housing 2 preferably by means of fastening screws 22. The end face 20 is provided with display elements 21 and/or operating elements 43 by means of which the operator may recognize events that occur in the battery pack 1, check the charge state by pressing an operating elements 43, or initiate other checking cycles.

The guide sections 17 in the form of guide grooves 19 extend parallel to one another and extend substantially between the lower end face 7 and the upper end face 20. In the illustrated embodiment, the guide grooves 19 end at the end facing the cover 3 in the housing 2 of the battery pack 1 wherein the ends 23 are closed in the direction of the longitudinal center axis 44 of the battery pack 1. The oppositely positioned end 24 of the guide groove 17 is open so that the guide groove 17 is open relative to the lower end face 7. In this connection, the lower end face 7 forms the insertion end 25 of the battery pack 1.

In the illustrated embodiment, a further guide groove 29 is provided in the narrow longitudinal sides 26, respectively, which is positioned off-center relative to the lateral center axis 47 of the narrow longitudinal side 26. The further guide grooves 29 are aligned moreover in the direction of the longitudinal center axis 44 of the battery pack 1 and are open at the ends 24 that are facing the lower end face 7 and are axially closed at their ends 23 that are facing the upper end face 20. The further guide grooves 29 extends into the cover 3 of the battery pack housing 2.

Figure 3:
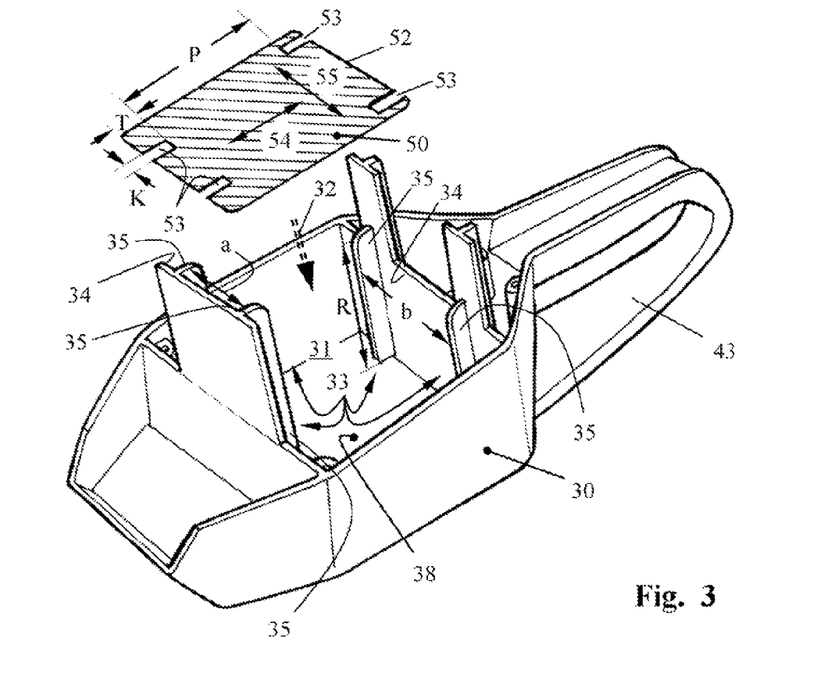
FIG. 3 is a schematic illustration of a housing part of a hand-held electric device embodied in this example as a hedge trimmer housing.

In FIG. 3 a device housing exemplified by a housing part 30 of a portable hand-guided power tool such as a hedge trimmer or motor chain saw is shown. The housing part 30 has a rear grip 43 that extends in the longitudinal direction of the housing part 30. In the housing 2 of the power tool a battery pack compartment 31 is formed that serves for receiving a battery pack 1 according to FIG. 1. The battery pack compartment 31 has guide elements 33 that extend in the insertion direction 32 and are positioned on opposed wide walls 34. The guide elements 33 in the illustrated embodiment are in the form of guide ribs 35 which are preferably embodied as a monolithic part with the housing part 30 and are positioned as projections on the wide walls 34. The guide ribs 35 extend across a partial height R of the battery pack compartment 31, i.e., do not extend across the entire height of the battery pack compartment 31.

Each wide wall 34 of the battery pack compartment 31 is provided with two guide ribs 35 that extend parallel to one another wherein the guide ribs 35 on a first wide wall 34 have a spacing a and the guide ribs 35 on the opposed wide wall 34 have a spacing b relative to one another. In this connection, the spacing b is greater than the spacing a; this is shown in FIG. 7.

Figure 7:
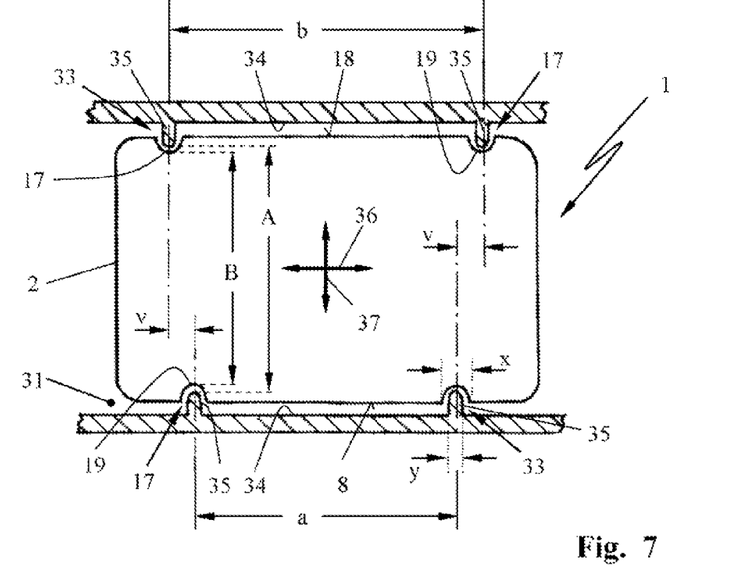
FIG. 7 shows in schematic illustration a battery pack inserted into the battery pack compartment.

FIG. 7 also shows that the guide elements 35 of the first wide wall 34 of the battery pack compartment are displaced relative to the guide elements 35 on the opposed wide wall 34 of the battery pack compartment by a spacing v. Likewise, the guide sections 17 of the wide longitudinal side 8 are positioned at a lateral spacing v relative to the guide sections 17 of the opposed wide longitudinal side 18 in the battery pack housing 2. The spacing a of the guide sections 17 on the wide longitudinal side 8 of the battery pack 1 is less than the spacing b of the guide sections 17 on the wide longitudinal side 18. In this connection, the spacing a is located within the spacing b. The guide sections 17 on the wide walls 34 of the battery pack compartment 31 are arranged in accordance with the spacing v and the spacings a and b.

Also, FIG. 7 shows that the width x of the guide groove 19 in the housing 2 of the battery pack is greater than the thickness (width) y of a longitudinal groove 35 on a wide wall 34 of the battery pack compartment 31. Therefore, as shown in FIG. 7, the battery pack 1 is guided with lateral play, as indicated by double arrow 36 of FIG. 7, in the battery pack compartment 31. Since moreover the width B of the battery pack housing 2 between the bottom area of the guide grooves 19 is smaller than the spacing A of the oppositely positioned guide ribs 35 in the battery pack compartment 31, the battery pack 1 is also secured with minimal play in the transverse direction in accordance with double arrow 37.

When the battery pack is inserted, with its insertion end 25 leading, into the battery pack compartment 31, the guide ribs 35 engage the guide grooves 17 of the battery pack housing 2 by means of their open ends 24 wherein the battery pack 1, in a rotational position that is predetermined structurally by the position of the guide ribs 35 and guide grooves 19, first remains moveable with minimal play in the direction of double arrows 36 and 37. This facilitates insertion of the battery pack 1 into the battery pack compartment 31. The guide grooves 29 provided in the narrow longitudinal sides 26 in an off-center position ensure also that the battery pack 1 is insertable only in a predetermined rotational position into the battery pack compartment 31. Moreover, the guide grooves 29 serve for a positionally correct arrangement and securing action of the battery pack 1 in a recharging device, not illustrated.

The battery pack 1 is contacted at the connector head 4 with contact elements 51 of a contact plate 50 that is provided in the area of the bottom 38 of the battery pack compartment 31. In FIG. 3 such a contact plate 50 is schematically illustrated. The contact plate 50 is inserted, preferably by engaging all guide elements 33, so that the contact plate 50—in accordance with positioning of the battery pack 1—can be lowered in a structurally predefined rotational position in the insertion direction 32 into the battery pack compartment 31. For this purpose, the contact plate 50 has on oppositely positioned longitudinal edges 52 cutouts 53 wherein each cutout 53 has a width K as well as a depth T. The width K of the cutouts 53 is wider than the thickness (width) y of the guide ribs 35 in the battery pack compartment 31. The depth T of oppositely positioned cutouts 53 is sized, such that the remaining contact plate section between the cutouts 53 has a length P that is smaller than the spacing A between the longitudinal edges of the guide ribs 19 (FIG. 7).

As a result of this structural configuration the contact plate 50 lowered into the battery pack compartment 31 is secured in its plane of extension with play on the guide ribs 35 so that a floating support of the contact plate 50 in the plane of the contact plate 50 is provided. The contact plate 50 is movable in the plane of extension as a result of play of the guide ribs 35 in the cutouts 53 in the direction of the arrows 54 and 55.

Figure 5:
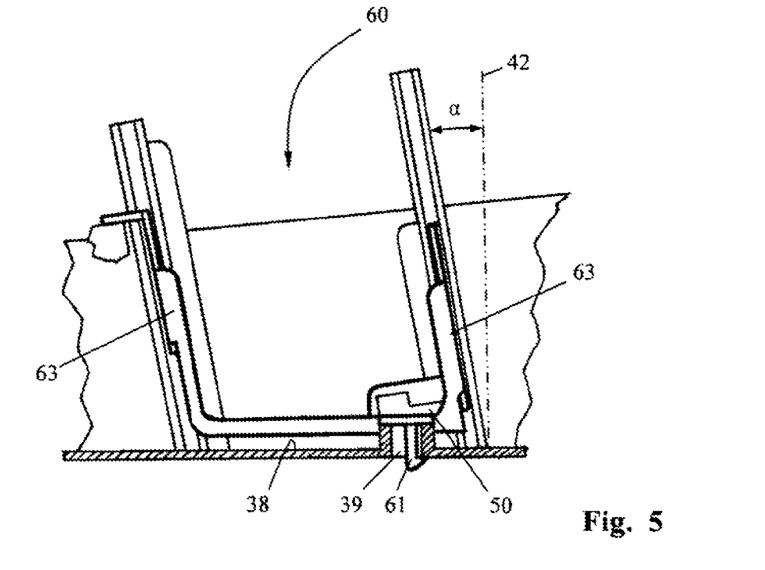
FIG. 5 shows in section the insert secured in the battery pack compartment of the housing part according to FIG. 3.
Figure 6:
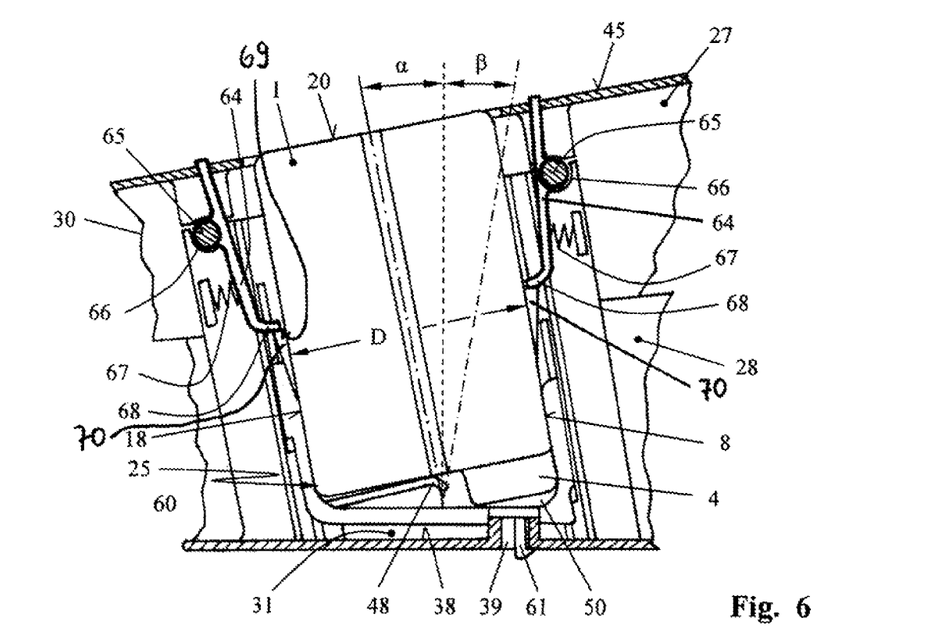
FIG. 6 is a section of the housing part according to FIG. 3 with a battery pack locked in the battery pack compartment.

As a result of the floating support of the contact plate 50 with contacts 51 arranged thereon (FIG. 8) the position-precise insertion of the contact elements 51 into the contact clips 12 is ensured. In the illustrated embodiment, the contact plate 50 is secured on a support insert 60 that is secured on the bottom 38 of the battery pack compartment 31. In the illustrated embodiment, the support insert 60 has a locking bracket 61 that engages, as shown in FIGS. 5 and 6, a locking opening 39 at the bottom 38 of the battery pack 1. The locking opening 39 and the locking bracket 61 are aligned relative to one another such that the floating support of the contact plate 50, at least in the direction of the double arrow 55, preferably also in the direction of the double arrow 54, is maintained (see FIG. 3).

Figure 4:
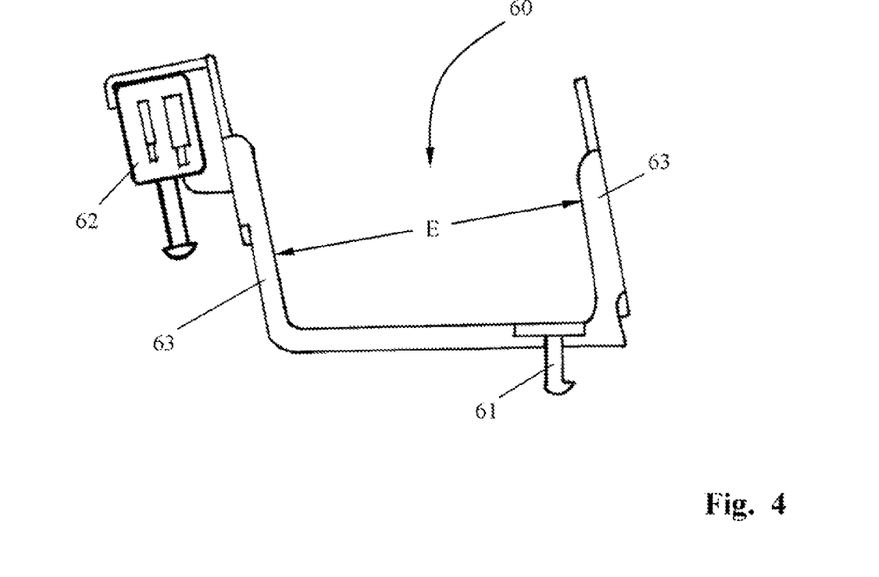
FIG. 4 is a side view of an insert as a holder for a contact plate.

FIG. 4 shows that the support insert 60 not only secures the contact plate 50 but also further components of the electric device, for example, electric components 62 of the electric device such as an on/off switch.

The opposed wide walls 34 of the battery pack compartment 31 are slantedly positioned to the front or to the rear, as shown in FIGS. 5 and 6, at an angle α or β relative to a perpendicular 42 relative to the housing bottom 38. The angle α or β is approximately between 2° and 20° so that a tilted position of the battery pack 1 in the battery pack compartments 31 results. Preferably, the battery pack 1 is tilted at an angle α of 10° to the rear. It can also be expedient to tilt the battery pack 1 at an angle β of in particular 15° to the front, as illustrated in FIG. 6.

The support insert 60 serves moreover for fixation of the battery pack 1 in the insertion position illustrated in FIG. 6. The support insert 60 has two boundary walls 63 that extend parallel to the wide walls 34 of the battery pack compartment 31 whose spacing E is approximately identical to the thickness D of the battery pack 1. The thickness D of the battery pack is measured between its wide longitudinal sides 8 and 18. In this way, as shown in FIG. 6, in the insertion position of the battery pack 1 in the battery pack compartment 31 the insertion end 25 is secured in the support insert 60 approximately without play so that the battery pack 1 in the insertion position shown in FIG. 6 is secured substantially without play.

In order to achieve early on a substantially play-free securing action in the housing part 30 upon insertion of the battery pack 1 into the battery pack compartment 31, the present invention proposes to form adjacent to the open ends 24 of the guide grooves 19 clamping sections 40 that are narrower than guide groove 19. The clamping section 40 has a structurally defined residual width y' that approximately corresponds to the thickness (width) y of a guide groove 35. In this way, it is achieved that upon insertion movement in the insertion direction 32 the battery pack 1 in the direction of the double arrow 36 (FIG. 7) will be seated without play on the guide ribs 35 shortly after engagement of the guide ribs 35. Since the battery pack housing 2 as well as the guide ribs 35 or the housing part 30 are comprised of plastic material, the width y' of the section 40 can even be slightly smaller than the width y of the guide rib 35 so that a clamping action is provided. In the insertion position illustrated in FIG. 6, the battery pack 1 is fixedly secured without play in the housing part 30. In this insertion position the upper end face 20 with the display elements 21 and/or operating elements 43 is positioned in the same plane as the top side 45 of the housing top part 27. The housing top part 27 and the housing bottom part 28 form together the housing part 30 of the power tool.

When the battery pack 1 is inserted into a battery pack compartment 31, it must be positioned correctly with regard to its rotational position and must be lowered with the insertion end 25 leading into the compartment 31. In this connection, the guide ribs 35 engage the guide grooves by entering through the open ends 24 of the guide grooves 19 and ensure, as they enter the clamping sections 40, a substantially play-free aligned position of the battery pack 1 in the battery compartment 31.

Upon lowering the battery pack 1 into the battery pack compartment 31, the insertion end 25 is moved into the support insert 60 so that the battery pack 1, and thus its connector head 4, is properly positioned in the direction of the double arrow 37 (FIG. 7). Upon further lowering of the battery pack 1 into the battery pack compartment 31 the connector head 4 approaches the contact plate 50 and the contact elements 51. As a result of the floating support the contact plate 50 is movable transversely to the insertion direction in the direction of double arrow 55 so that an orientation of the contact plate 50 relative to the contact slots 10 of the connector head 4 on the battery pack 1 can be realized. It is further provided according to the present invention that at least one centering element is disposed on the contact plate 50 that is preferably in the form of a centering stay 56 and has correlated therewith a matching centering receptacle, for example, a centering slot 57 in the housing of the connector head 4. The centering slot 57 extends, similar to the contact slots 10, from the bottom 7a of the connector head 4 up to its end face 11. In the illustrated embodiment, two centering stays 56 are provided between which the contact elements 51a of control connectors are positioned while the outer contact elements 51 serve for transmission of power.

The centering stays 56, that can be embodied also as centering pins 58 or the like, projects past the contacts elements 51 and 51a so that first the centering stays 56 will contact the connector head 4. The centering slots 57 are slightly widened so that an easy insertion of the centering heads 58 into the centering slot 57 is realized and an alignment of the contact plate 50 in the direction of the double arrow 55 relative to the connector head 4 can be effected. In this way, it is ensured that the contact elements 51 and 51a upon further lowering of the battery pack 1 into the battery pack compartment 31 are positioned correctly relative to the contact slots 10 and safely contact the contact clips 12, 12a without causing any mechanical damage.

Since the centering stays 56 project past the contact elements 51, 51a, these centering stays 56 serve at the same time as protective elements to prevent mechanical damage of the contact clips 12, 12a when the battery pack compartment 31 is empty.

Figure 2:
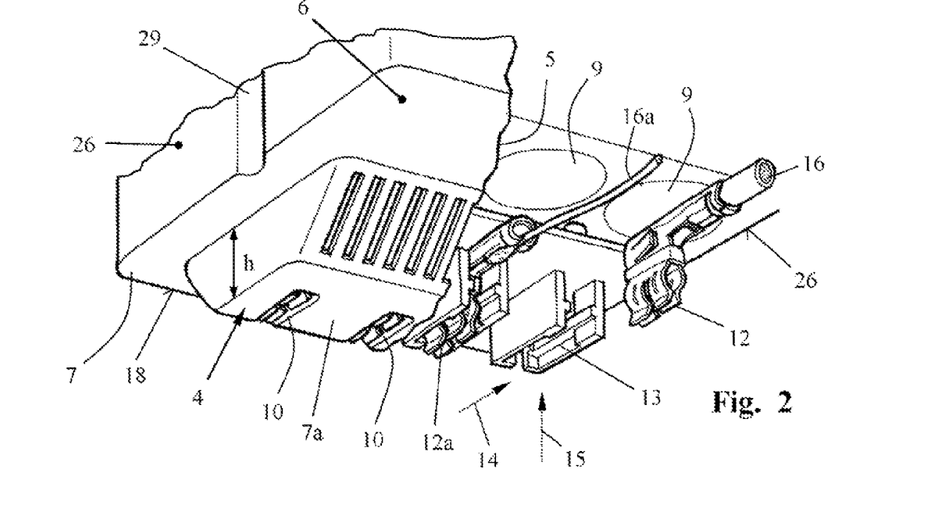
FIG. 2 is a view onto the connecting side of the battery pack according to FIG. 1.

Because of the tilted position of the battery pack 1 relative to the contact plate 50 an insertion of the contact elements 51, 51 a into the contact clips 12, 12a is realized in an insertion/sliding movement that is comprised of movement components in the direction of arrows 14 and 15 (FIG. 2). In this way, a safe electrical contacting is achieved.

Advantageously, on the side of the contact plate 50 that is facing away from the connector head 4 a cover 59 is positioned so that between the contact plate 50 and the cover 59 cable passages 49 for passing through connecting leads 16 may be formed.

It is further provided by the present invention, as shown in FIG. 6, that the battery pack 1 is secured against the force of a lifting spring 48 by a locking action in the illustrated insertion position in the battery pack compartment 31. In the illustrated embodiment according to FIG. 6, locking pawls 64 are provided that are pivotably secured by means of bearing bolts 65 in the housing part 30 of the power tool. In the illustrated embodiment according to FIG. 6, the bearing bolts 65 are inserted into a bearing receptacle 66 of the housing bottom part 28 wherein the bearing receptacle 66 is closed by attaching the housing top part 27. In the closed bearing receptacle 66 the bearing bolts 65 are captively secured and are prestressed by the force of a set spring 67 into a pivot position toward the battery pack compartment 31. At least the locking end 68 of a locking pawl 64 projects into the battery pack compartment 31 and is supported on a locking stop 69 that is formed on the end of a ramp 70 on a wide longitudinal side 8 of the battery pack housing 2. In the illustrated embodiment, on a wide longitudinal side 8 between the guide grooves 19 two locking ramps 70 are provided whose locking stops 69 together rest on a locking pawl 64 that has am appropriate width. On the oppositely positioned wide longitudinal side 18 corresponding ramps 70 with locking stops 69 are provided.

Upon insertion of the battery pack 1 into the battery pack compartment 31, the locking pawls 64 are forced back by means of the ramps 70 until the locking ends 68 engage the locking stops 69 and the set spring 67 pivots the locking pawl 64 into the locking position illustrated in FIG. 6.

Figure 11:
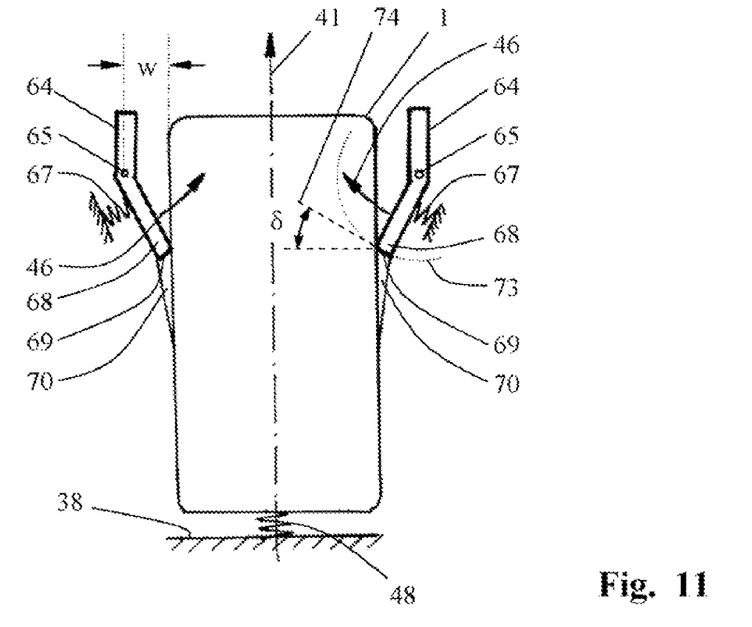
FIG. 11 shows in schematic illustration a first locking device for the battery pack in the battery pack compartment.

FIG. 11 shows that the locking pawls 64 are designed and supported such that the spring force of the lifting spring 48 oriented in the direction of arrow 41 is introduced into the locking pawl 64 through the locking stops 68 such that the locking pawls 64 carry out a rotary movement in the direction of arrow 46, i.e., the locking pawls 64 are force-loaded into the locking position in this way.

This locking effect is achieved in that the point of attack of the spring force of the lifting spring 48 is located at the locking end 68 at a spacing w relative to the bearing bolt 65 of the locking pawl 64 and the locking end 68 is positioned between the battery pack 1 and the bearing bolt 65.

For releasing the locking action, the two locking pawls 64 must be pivoted opposite to the direction of the arrow 46 for which purpose the battery pack 1 is forced by the user lightly against the lifting spring 48 in order to produce a satisfactory play between the stop 69 and the locking end 68 for releasing the locking action.

In order to avoid a pressing action of the battery pack 1 against the force of the lifting spring 48 for releasing the battery pack 1 from the battery pack compartment 31, it may be advantageous to design the surfaces of the locking stop 69 on the battery pack 1 to be slanted. Preferably, the surface of the stop 69 is positioned as a tangent 74 relative to the circle 73 (see FIG. 11) described by the locking end 68 upon pivoting so that the locking end 68 can be pivoted away without having to move the battery pack 1 against the force of the lifting spring 48. The surface of the locking stop 69 is positioned at an angle δ to the horizontal or to the housing bottom 6 of the battery pack housing 2 or its end faces 7 and 20.

Figure 12:
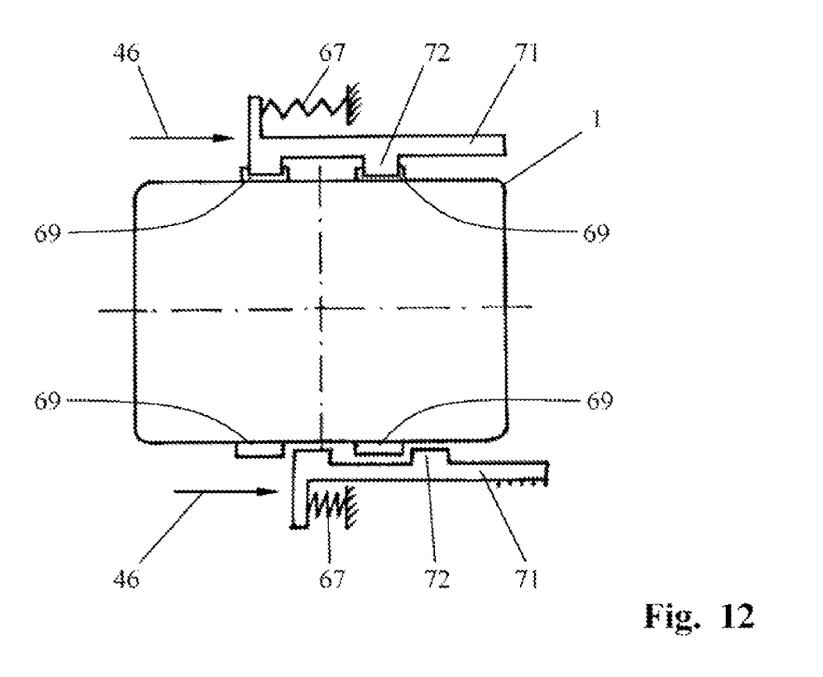
FIG. 12 shows in schematic illustration a second locking device for the battery pack in the battery pack compartment.

In FIG. 12 a further locking possibility of a battery pack 1 in a battery pack compartment is illustrated schematically. The locking members 71 illustrated here are movable transversely to the locking stops 69 wherein for releasing the battery pack 1 the user must suppress the locking member 71 in the direction of the arrow 46 so that the leg 72 of the locking member 71 releases the locking stops 69.

Upon insertion of the battery pack the locking members 71 must also be actuated in the direction of arrow 46 in order to release the insertion passage for the battery pack 1.

The specification incorporates by reference the entire disclosure of German priority document 10 2009 012 184.6 having a filing date of Feb. 27, 2009.

While specific embodiments of the invention have been shown and described in detail to illustrate the inventive principles, it will be understood that the invention may be embodied otherwise without departing from such principles.

What is claimed is:

1. A hand-held electric device comprising:
   a device housing comprising a battery pack compartment;
   a battery pack disposed in said battery pack compartment and inserted in an insertion direction into said battery pack compartment;
   said battery pack compartment comprising guide elements extending in said insertion direction;
   said battery pack comprising a battery pack housing and guide sections provided on said battery pack housing and interacting with said guide elements, wherein said guide elements engage with play said guide sections;
   said battery pack comprising an electric connector head disposed on said battery pack housing;
   said battery pack compartment comprising contact elements, wherein in a predetermined insertion position of said battery pack in said battery pack compartment said contact elements electrically contact said connector head;
   a contact plate, wherein said contact plate is floatingly supported in said battery pack compartment within a plane of extension of said contact plate and said contact elements are disposed on said contact plate;
   a centering element that is disposed in said battery pack compartment so as to project past said contact elements and that engages a centering receptacle of said battery pack in an initial insertion position of said battery pack.

2. The electric device according to claim 1, wherein said contact plate is secured in said battery pack compartment so as to be moveable in a plane of extension of said contact plate in all directions.

3. The electric device according to claim 1, wherein said contact plate is secured with play on said guide elements that extend in said insertion direction.

4. The electric device according to claim 3, wherein said contact plate has cutouts and said guide elements engage with play said cutouts.

5. The electric device according to claim 1, wherein said contact plate is secured to a bottom of said battery pack compartment.

6. The electric device according to claim 5, wherein said contact plate is locked on said bottom.

7. The electric device according to claim 1, further comprising a contact plate support that is guided and secured on said guide elements of said battery pack compartment, wherein said contact plate is arranged on said contact plate support.

8. The electric device according to claim 7, wherein said contact plate support is adapted to support electric components.

9. The electric device according to claim 1, wherein said connector head has contact slots for engagement of said contact elements, wherein said contact slots extend from a bottom of said connector head into an end face of said connector head.

10. The electric device according to claim 9, wherein said centering element is provided on said contact plate and said centering receptacle is provided on said connector head.

11. The electric device according to claim 1, wherein said connector head projects from a plane of a housing bottom of said battery pack housing.

12. The electric device according to claim 1, wherein said battery pack is tilted relative to a housing bottom of said device housing at an angle of approximately 2° to 20°.

13. The electric device according to claim 12, wherein said battery pack is tilted to a front or to a rear of the electric device at an angle of 10° to 15°.

14. The electric device according to claim 1, wherein said battery pack compartment comprises locking members arranged on opposed wide sides of said battery pack compartment and wherein said battery pack has locking stops interacting with said locking members of said battery pack compartment, wherein said battery pack is locked against a force of a lifting spring in said predetermined insertion position by said locking members and said locking stops.

15. The electric device according to claim 14, wherein said locking members are pivot levers each having a bearing bolt captively secured between a housing top part and a housing bottom part of said device housing.

16. The electric device according to claim 1, wherein said guide elements are longitudinal guide ribs.

17. The electric device according to claim 1, wherein said guide sections are longitudinal guide grooves that extend substantially across a height of said battery pack on a wide longitudinal side between end faces of said battery pack.

18. The electric device according to claim 17, wherein an end of said guide grooves at an end face where said connector head is located is open and has a width that is wider than a width of said guide elements.

19. The electric device according to claim 17, wherein said guide grooves have a clamping section having a width that matches approximately a width of said guide elements, respectively.

20. The electric device according to claim 1, wherein said guide elements are arranged on first and second longitudinal sides of said battery pack compartment, wherein said first and second longitudinal sides are opposed to one another and wherein said guide elements on said first longitudinal side are displaced laterally relative to said guide elements on said second longitudinal side.

21. The electric device according to claim 20, wherein said first and second longitudinal sides each have two said guide elements that are spaced apart from one another, wherein a spacing of said two guide elements on said first longitudinal side relative to one another is greater than a spacing of said two guide elements on said second longitudinal side relative to one another.

22. The electric device according to claim 21, wherein said two guide elements of said first longitudinal side are positioned between said two guide elements of said second longitudinal side in a view form said first longitudinal side onto said second longitudinal side.

23. The electric device according to claim 1, wherein said battery pack housing has a first end face and a second end face opposite said first end face, wherein said connector head is arranged on said first end face and wherein said second end face comprises at least one of display element and an operating element.

* * * * *